US012011949B2

(12) United States Patent
Briggs et al.

(10) Patent No.: US 12,011,949 B2
(45) Date of Patent: Jun. 18, 2024

(54) RANDOMIZED SURFACE PANEL KIT AND SURFACE PANEL SYSTEM

(71) Applicant: CertainTeed LLC, Malvern, PA (US)

(72) Inventors: Timothy Briggs, Clinton, MA (US); Brice Dubost, Newton, MA (US)

(73) Assignee: CertainTeed LLC, Malvern, PA (US)

(*) Notice: Subject to any disclaimer, the term of this patent is extended or adjusted under 35 U.S.C. 154(b) by 31 days.

(21) Appl. No.: 17/987,618

(22) Filed: Nov. 15, 2022

(65) Prior Publication Data

US 2023/0278360 A1 Sep. 7, 2023

Related U.S. Application Data

(63) Continuation of application No. 16/906,112, filed on Jun. 19, 2020, now Pat. No. 11,498,357.

(60) Provisional application No. 62/864,156, filed on Jun. 20, 2019.

(51) Int. Cl.

| | |
|---|---|
| ***E04F 13/08*** | (2006.01) |
| ***B44C 3/12*** | (2006.01) |
| ***E04F 13/14*** | (2006.01) |
| ***E04F 15/022*** | (2006.01) |

(52) U.S. Cl.

CPC .......... *B44C 3/123* (2013.01); *E04F 13/0862* (2013.01); *E04F 13/0871* (2013.01); *E04F 15/022* (2013.01); *E04F 2203/02* (2013.01)

(58) Field of Classification Search

CPC ...... B44C 3/123; E04F 13/072; E04F 13/076; E04F 13/0871; E04F 13/0862; E04F 13/0873; E04F 13/0889; E04F 13/0894; E04F 13/105; E04F 13/123; E04F 13/14; E04F 13/147; E04F 2203/02

See application file for complete search history.

(56) References Cited

U.S. PATENT DOCUMENTS

| | | | | |
|---|---|---|---|---|
| 1,963,966 A * | 6/1934 | Bennett | E04F 13/14 | |
| | | | D25/151 | |
| 2,063,935 A * | 12/1936 | Kirschbraun | E04F 13/147 | |
| | | | 52/519 | |
| 2,122,577 A * | 7/1938 | Mattes | E04F 13/147 | |
| | | | 52/541 | |
| 2,209,283 A * | 7/1940 | Ronzone | E04F 13/147 | |
| | | | D25/151 | |
| 2,323,299 A * | 7/1943 | Craig | E04F 13/147 | |
| | | | 428/161 | |

(Continued)

*Primary Examiner* — Kyle J. Walraed-Sullivan

(74) *Attorney, Agent, or Firm* — McDonnell Boehnen Hulbert & Berghoff LLP

(57) ABSTRACT

The present disclosure relates generally to surface panels for covering a building surface. The disclosure relates more particularly to a surface panel kit and system including a set of panels for attaching to a support structure. Each of the panels includes opposing ends, and each end includes one of a group of end configurations. A first end configuration is mateable with a first portion of the group and is unmateable with a second portion of the group, and a second end configuration is mateable with a third portion of the group and is unmateable with a fourth portion of the group. The set of panels includes at least three panel types including a first panel type with the first and second end configurations, a second panel type with the first and without the second end configurations, and a third panel type with the second and without the first end configurations.

17 Claims, 6 Drawing Sheets

(56) References Cited

U.S. PATENT DOCUMENTS

| | | | | | |
|---|---|---|---|---|---|
| 3,174,893 | A * | 3/1965 | Church | B44F 11/06 | 52/309.3 |
| 3,494,266 | A * | 2/1970 | Baumberger | E01C 5/00 | 52/311.2 |
| 3,613,326 | A * | 10/1971 | Mollman | E04F 13/0871 | 52/309.1 |
| 3,665,617 | A * | 5/1972 | Gilbert | B44C 3/123 | 434/96 |
| 3,729,891 | A * | 5/1973 | Olsen | E04C 2/32 | D5/1 |
| 3,870,423 | A * | 3/1975 | Peitz, Jr. | E01C 5/00 | 52/608 |
| 3,908,326 | A * | 9/1975 | Francis | E04F 13/0862 | 52/541 |
| 4,133,152 | A * | 1/1979 | Penrose | B44F 5/00 | D25/138 |
| 4,217,740 | A * | 8/1980 | Assanti | E04F 15/08 | D25/138 |
| 4,223,890 | A * | 9/1980 | Schoen | A63F 9/10 | 428/44 |
| 4,773,790 | A * | 9/1988 | Hagenah | E01C 5/06 | 404/38 |
| 5,232,646 | A * | 8/1993 | Nasvik | B28B 7/36 | 264/254 |
| 5,267,810 | A * | 12/1993 | Johnson | E01C 5/06 | 404/41 |
| 5,286,139 | A * | 2/1994 | Hair | E01C 5/00 | 404/38 |
| 5,333,430 | A * | 8/1994 | Vidal | E01C 5/00 | D25/138 |
| 5,342,142 | A * | 8/1994 | Barth | E01C 5/00 | 404/41 |
| 5,470,623 | A * | 11/1995 | Lucas | E04F 15/08 | 52/311.2 |
| 5,520,388 | A * | 5/1996 | Osborn | B44C 3/123 | 428/44 |
| 5,619,830 | A * | 4/1997 | Osborn | A63F 9/0669 | D25/138 |
| 5,755,068 | A * | 5/1998 | Ormiston | E04F 15/02033 | 428/167 |
| 5,775,040 | A * | 7/1998 | Lalvani | A63F 9/10 | 52/311.2 |
| 5,927,715 | A * | 7/1999 | Novello | A63F 9/10 | 273/157 R |
| D431,871 | S * | 10/2000 | Abbrancati | D25/113 | |
| 6,129,329 | A * | 10/2000 | Nasvik | B28B 7/36 | 249/189 |
| 6,455,113 | B1 * | 9/2002 | Bilodeau | B44F 9/00 | 362/153.1 |
| D537,501 | S * | 2/2007 | Riccobene | D25/113 | |
| 7,527,236 | B2 * | 5/2009 | Nasvik | B28B 7/0073 | 249/55 |
| 7,987,646 | B2 * | 8/2011 | Race | E04F 13/0842 | 52/506.04 |
| 7,993,718 | B2 | 8/2011 | Riccobene | | |
| 8,002,494 | B2 * | 8/2011 | Ciccarello | E01C 5/06 | 404/34 |
| 8,151,530 | B2 * | 4/2012 | Schwarz | E04F 13/185 | 52/555 |
| 8,256,179 | B2 * | 9/2012 | Nasvik | C04B 28/04 | 52/506.01 |
| 8,413,397 | B2 | 4/2013 | Lacas | | |
| 8,448,400 | B2 | 5/2013 | Garcia | | |
| 9,308,438 | B2 * | 4/2016 | Yoshida | A63F 9/10 | |
| 9,404,226 | B2 | 8/2016 | Dignard | | |
| 9,739,028 | B2 * | 8/2017 | Riccobene | E02D 29/025 | |
| 9,909,322 | B1 * | 3/2018 | Sadleir | B29C 41/02 | |
| 10,106,988 | B1 * | 10/2018 | Stone | E04F 13/0873 | |
| 10,682,786 | B2 * | 6/2020 | Riccobene, Jr. | B28B 7/007 | |
| D899,631 | S * | 10/2020 | Conklin, III | D25/113 | |
| 11,372,283 | B1 * | 6/2022 | Tsai | G02F 1/133607 | |
| 2004/0045248 | A1 * | 3/2004 | Drost | E01C 5/00 | 52/574 |
| 2004/0191461 | A1 * | 9/2004 | Riccobene | E04F 15/02 | 428/44 |
| 2005/0064128 | A1 * | 3/2005 | Lane | E04C 2/296 | 428/44 |
| 2005/0188642 | A1 * | 9/2005 | Correia | E04F 13/0862 | 52/506.1 |
| 2005/0210811 | A1 * | 9/2005 | Nasvik | E04F 13/147 | 52/596 |
| 2006/0003132 | A1 * | 1/2006 | Correia | E04F 13/0885 | 428/44 |
| 2006/0182923 | A1 * | 8/2006 | Riccobene | E04C 1/395 | 428/44 |
| 2006/0197257 | A1 * | 9/2006 | Burt | B29C 44/1271 | 264/255 |
| 2007/0077387 | A1 * | 4/2007 | Riccobene | B44F 3/00 | 428/44 |
| 2007/0137127 | A1 * | 6/2007 | Lincoln | B44C 5/0453 | 52/384 |
| 2007/0209308 | A1 * | 9/2007 | Barrett | B28B 7/346 | 52/506.05 |
| 2007/0217865 | A1 * | 9/2007 | Castonguay | E01C 15/00 | 404/41 |
| 2008/0095577 | A1 * | 4/2008 | Brun | E01C 5/00 | 404/42 |
| 2008/0209828 | A1 | 9/2008 | Riccobene | | |
| 2009/0056257 | A1 * | 3/2009 | Mollinger | B44C 5/0461 | 52/309.4 |
| 2009/0193742 | A1 * | 8/2009 | Wolf | E04F 13/0873 | 52/311.1 |
| 2009/0235600 | A1 * | 9/2009 | Logan | B28B 13/0275 | 264/232 |
| 2009/0249719 | A1 * | 10/2009 | Broehl | E04F 13/147 | 52/250 |
| 2010/0307092 | A1 * | 12/2010 | Bouchard | B44C 1/28 | 52/311.1 |
| 2011/0067333 | A1 * | 3/2011 | Lacas | E04F 13/141 | 52/311.1 |
| 2011/0289877 | A1 * | 12/2011 | Correia | E04F 13/147 | 52/561 |
| 2011/0293873 | A1 * | 12/2011 | Riccobene | E04B 2/12 | 428/44 |
| 2014/0047790 | A1 * | 2/2014 | Ferronato | B44F 9/04 | 428/141 |
| 2014/0057076 | A1 * | 2/2014 | Della Pepa | E04F 13/0898 | 428/317.1 |
| 2014/0083033 | A1 * | 3/2014 | McIntosh | E04F 13/0885 | 52/302.1 |
| 2014/0124472 | A1 * | 5/2014 | Radvanyi | A63F 9/10 | 428/66.7 |
| 2014/0174015 | A1 * | 6/2014 | Gaudreau | E04F 13/0837 | 52/745.21 |
| 2014/0260057 | A1 * | 9/2014 | Riccobene | E01C 5/06 | 52/588.1 |
| 2015/0176224 | A1 * | 6/2015 | Dignard | E01C 5/06 | 404/41 |
| 2017/0175390 | A1 * | 6/2017 | Mountfort | B44C 5/0461 | |
| 2018/0202170 | A1 * | 7/2018 | Duyck | E04F 15/02033 | |
| 2019/0301178 | A1 * | 10/2019 | Steffes | E04F 13/185 | |
| 2019/0338533 | A1 * | 11/2019 | Palladino | B32B 5/32 | |

* cited by examiner

RANDOMIZED SURFACE PANEL KIT AND SURFACE PANEL SYSTEM

CROSS-REFERENCE TO RELATED APPLICATIONS

This application is a continuation of U.S. patent application Ser. No. 16/906,112, filed Jun. 19, 2020, which claims the benefit of priority of U.S. Provisional Patent Application No. 62/864,156, filed Jun. 20, 2019, each of which is hereby incorporated herein by reference in its entirety.

BACKGROUND OF THE DISCLOSURE

1. Field of the Disclosure

The present disclosure relates generally to surface panels for covering a building surface, for example, suitable for covering the exterior surface of a house. The present disclosure relates more particularly to a surface panel kit for covering a building surface with a plurality of panels that form a decorative design.

2. Technical Background

Many building surfaces are constructed with a supporting structure, such as a frame or substrate layer, that is covered with a decorative layer. For example, exterior walls may include an exterior sheathing that is covered with cladding that is, or appears to be, wood siding, brick, or stone. Other walls may include panels attached to a frame or furring strips. Likewise, a floor may be constructed with a floor sublayer that is covered with decorative flooring, such as tile or wood.

There are various advantages that a decorative layer formed from a synthetic product might have compared to a layer formed from a natural product. For example, the synthetic product may be less expensive, more durable and/or easier to install than the natural counterpart. However, customers often desire a building surface with a decorative layer that has the aesthetic of a traditional natural product. A common visible distinction between synthetic products and natural products is that natural products typically vary in appearance, while synthetic products are often uniform in appearance. One attempt to avoid the uniformity of synthetic products has been to replicate the appearance of a natural product. Thus, a building surface panel may appear as a single natural product, or a group of natural products that includes the varying grains or edges that a natural product might have. However, even if a panel has a very natural aesthetic, observers are apt to notice if the aesthetic repeats. Accordingly, a discernible repetitive pattern can reveal that a building surface is made of a synthetic product, rather than a natural product.

One attempt to avoid a repetitive pattern is to make several types of panels that each have a different appearance. But there is still a risk of an installer placing the panels in a repeating pattern, which will identify the decorative surface as synthetic. Another option is to use a very large number of different panel types so that few, if any, of the same panel type is used in an installation. But creating such a large number of panel types can be very expensive.

Observers also find abstract patterns interesting if they are non-repetitive, as they have a custom appearance. Accordingly, with both natural decorative designs and abstract decorative designs, non-repetitive patterns can be advantageous.

The present inventors have recognized that a kit for installing building surface panels that easily avoids repetition would be attractive to builders.

SUMMARY OF THE DISCLOSURE

In one aspect, the present disclosure provides a wall panel kit comprising:

- a set of panels configured for attachment to a support structure, each of the panels including an upper side, a lower side, opposing ends, and a panel body having a front face including a decorative design,
- wherein the ends of each panel are configured to mate with the ends of other panels in the set of panels to form a linear row of panels that includes a continuous decorative surface formed by the front faces of the panel bodies in the linear row,
- wherein each end includes one of a group of end configurations, the group of end configurations including:
  - a first end configuration that is mateable with a first portion of the group of end configurations and that is unmateable with a second portion of the group of end configurations, and
  - a second end configuration that is mateable with a third portion of the group of end configurations and that is unmateable with a fourth portion of the group of end configurations, and
- wherein the set of panels comprises at least three panel types including:
  - a first panel type that includes the first end configuration with the second end configuration,
  - a second panel type that includes the first end configuration without the second end configuration, and
  - a third panel type that includes the second end configuration without the first end configuration.

In another aspect, the disclosure provides

- a support structure; and
- an array of panels of the surface panel kit according to the disclosure attached to the support structure,
- wherein the array of panels is arranged in linear rows with mateable end configurations coupled to one another.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
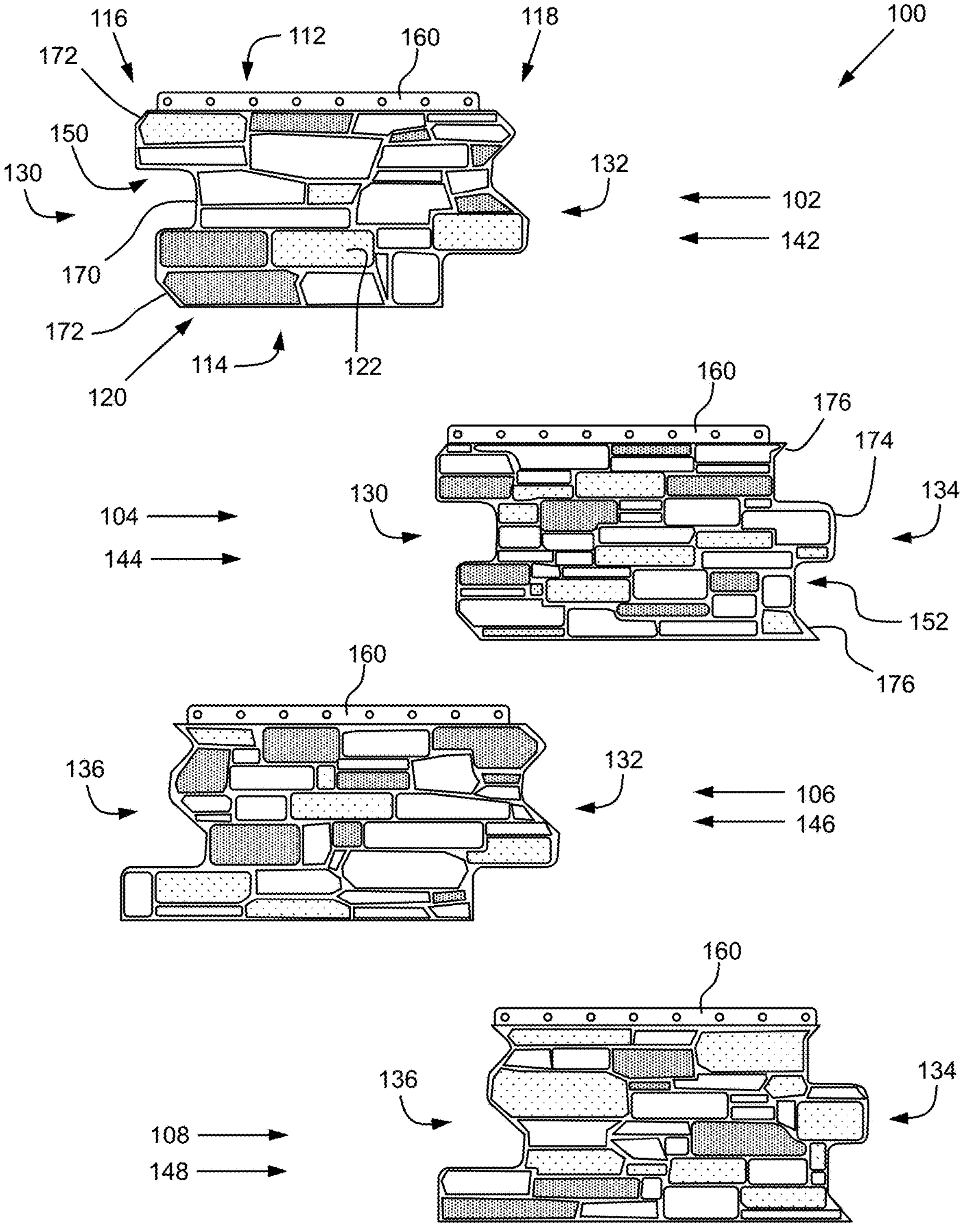
FIG. 1 is a schematic front view of a surface panel kit according to an embodiment of the disclosure.

As described above, the present inventors have noted that many decorative building surfaces can have unintended repetition that is identifiable by observers. The present inventors have determined that a surface panel kit that can be easily installed while avoiding repetition would be attractive to builders.

Accordingly, one aspect of the disclosure is a wall panel kit including a set of panels configured for attachment to a support structure. Each of the panels includes an upper side, a lower side, opposing ends, and a panel body. The panel body has a front face that includes a decorative design. The ends of each panel are configured to mate with the ends of other panels in the set of panels to form a linear row of panels that includes a continuous decorative surface formed by the front faces of the panel bodies in the linear row. Each end of the panels includes one of a group of end configurations, and the group of end configurations includes a first end configuration and a second end configuration. The first end configuration is mateable with a first portion of the group of end configurations and is unmateable with a second portion of the group of end configurations. Further, the second end configuration is mateable with a third portion of the group of end configurations and is unmateable with a fourth portion of the group of end configurations. The set of panels has at least three panel types including a first panel type that includes the first end configuration with the second end configuration, a second panel type that includes the first end configuration without the second end configuration, and a third panel type that includes the second end configuration without the first end configuration.

In some embodiments, as explained in more detail below, the portions of the group of end configurations that are mateable with some end configurations and not with others include a single end configuration. In other words, in some embodiments, an end configuration is mateable with one end configuration in the group and/or unmateable with one end configuration in the group. In other embodiments, the portions include multiple end configurations. Further, as also explained in more detail below, in some embodiments the first portion of the group that is mateable with the first end configuration is the same as the fourth portion of the group that is unmateable with the second end configuration. Likewise, in some embodiments, the second portion of the group that is unmateable with the first end configuration the same as the third portion that is mateable with the second end configuration.

The term mateable, as used herein, refers to mechanical compatibility between two end configurations that allows the panels to be positioned adjacent to one another such that the front faces of the adjacent panel bodies forms a substantially continuous front surface. For example, panels with mateable end configurations may be positioned such that the rear surfaces of both panels, which are configured to abut the support structure, are coplanar, while the front faces are adjacent along the bordering ends. In contrast, unmateable end configurations prevent two panels from being installed on a support structure with the respective unmateable end configurations connected and the front face of the panels forming a continuous front surface.

A portion of such a surface panel kit is schematically shown in a front view in FIG. 1. Surface panel kit 100, includes a set of panels including four panel types. One of each panel type included in kit 100 is shown in FIG. 1, which includes panels 102, 104, 106 and 108. Each of the panels includes an upper side 112, a lower side 114, a first end 116, and a second end 118, as identified in FIG. 1 with respect to panel 102. Each panel also includes a panel body 120 with a front face 122 having a decorative design. The ends 116, 118 of the panels in the surface panel kit 100 are configured to mate with the ends of other panels in the kit in a manner that forms linear rows of panels.

Figure 2:
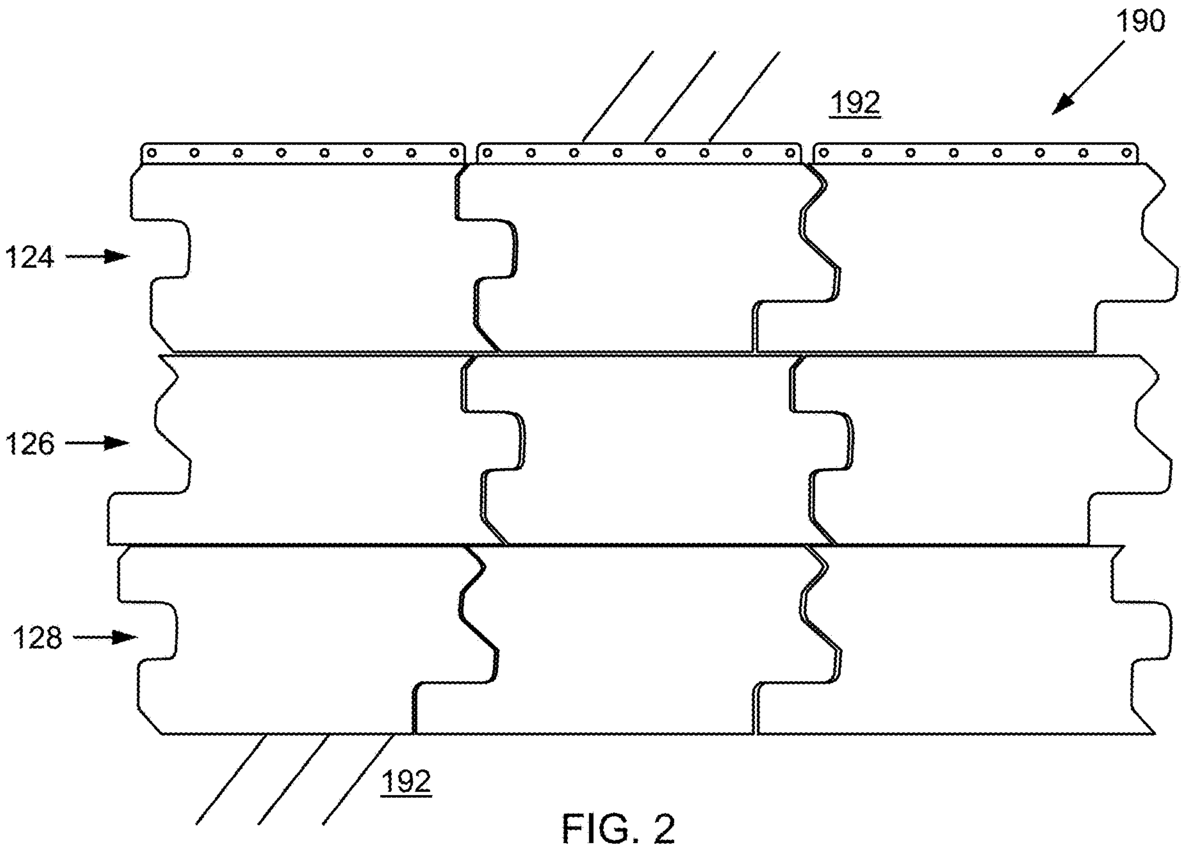
FIG. 2 is a schematic front view of a surface panel system including the surface panel kit of FIG. 1.

For example, FIG. 2 shows a surface panel system 190 including nine of the panels of surface panel kit 100 arranged in three rows of three. The decorative design of the panels has been removed in FIG. 2 so that the boundaries of the panels are visible. As shown in FIG. 2, each of the nine panels is mated along at least one of its ends with an adjacent panel having a matching end. The mated arrangement of the adjacent panels organizes the panels into linear rows. The phrase linear row, as used herein, refers to a group of panels that are aligned such that a straight line may pass through each of the panels in the group. For example, a linear row may include a group of panels with center points that all fall on a straight line. In FIG. 2, the panels are arranged in three linear rows—an upper row 124, a middle row 126 and a lower row 128, each of which includes three panels.

Referring again to FIG. 1, the surface panel kit 100 includes a group of end configurations 130, 132, 134, 136. First end configuration 130 is mateable with third end configuration 134 and is unmateable with the remainder of the group of end configurations. Likewise, second end configuration 132 is mateable with fourth end configuration 136 and is unmateable with the remainder of the group of end configurations.

The set of panels includes four panel types 142, 144, 146, 148 which are represented in FIG. 1 by panels 102, 104, 106, 108. The first panel type 142 includes the first end configuration 130 with the second end configuration 132, disposed at opposite ends of the panel. The second panel type 144 includes the first end configuration 130 without the second end configuration 132, and instead includes a third end configuration 134. The third panel type 146 includes the second end configuration 132 without the first end configuration 130, and instead includes a fourth end configuration 136. The fourth panel type 148 includes the third end configuration with the fourth end configuration.

Figure 3:
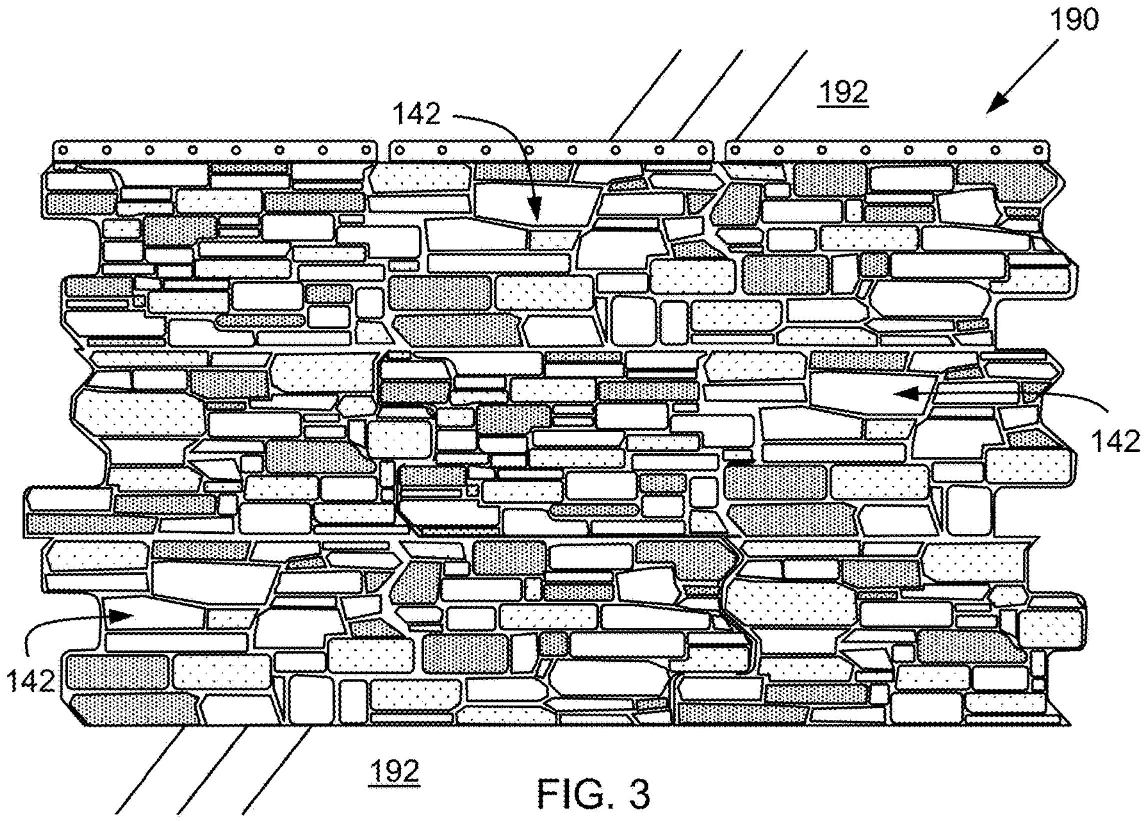
FIG. 3 is another schematic front view of the surface panel system of FIG. 2.

This pairing of end configurations and panel types fosters randomization of the design on the front surface without the need for specific panel arrangements. After each panel is placed on the support structure, the selection of the subsequent tile is limited to two panel types of the set, while the other two panel types will be unmateable. This gives the installer a constrained option for the following panel that will be installed, which introduces randomness into the order of panels in a given row of panels. Accordingly, the decorative design of the installed panels has a high likelihood of having a randomized appearance. FIG. 3 shows an embodiment of a surface panel system 190 including nine of the panels from surface panel kit 100 disposed on a support structure 192. The mateable end configurations are connected to one another to form a continuous decorative surface on the support structure 192. The varied coupling of the panels forms a decorative surface that is non-repetitive.

In certain embodiments as otherwise described herein, each end configuration is either a left-side configuration that is mateable with a matching right-side configuration or a right-side configuration that is mateable with a matching left side configuration. In some embodiments, the first end configuration is a first left side configuration and the second end configuration is a first right-side configuration, and the group of end configurations further comprises a second left side configuration and a second right side configuration.

For example, each of the end configurations 130, 132, 134, 136 is configured to mate with a matching end configuration from the group of end configurations. In particular, first end configuration 130 is a left-side configuration that is mateable with third end configuration 134, which is a right-side configuration. Likewise, second end configuration 132 is a right-side configuration that is mateable with fourth end configuration 136, which is a second left-side configuration.

In certain embodiments as otherwise described herein, the set of panels comprises at least four panel types including the first panel type that includes the first left-side configuration and the first right-side configuration, the second panel type that includes the first left-side configuration and the second right-side configuration, the third panel type that includes the second left-side configuration and the first right-side configuration, and a fourth panel type that includes the second left-side configuration and the second right-side configuration. For example, in surface panel kit 100 first panel type 142 includes first left-side configuration 130 and first right-side configuration 132, second panel type 144 includes first left-side configuration 130 and second right-side 134, third panel type 146 includes second left-side configuration 136 and first right-side configuration 132, and fourth panel type 148 includes second left-side configuration 136 and second right-side configuration 134. Thus, as an example, the first end 116 of first panel type 142, which includes the first left-side configuration 130, is mateable with the second panel type 144 and the fourth panel type 148, both of which include second right-side configuration 134 that matches first left-side configuration 130. Likewise, the second end 118 of first panel type 142, which includes the first right-side configuration 132, is mateable with the third panel type 146 and the fourth panel type 148, both of which include second left-side configuration 136.

In certain embodiments as otherwise described herein, the first end configuration and the second end configuration are rotationally symmetrical about an axis that is perpendicular to the front face. For example, in some embodiments, such a rotationally symmetrical end configuration includes a projection on an upper portion of the end configuration and a matching indentation on a lower portion of the end configuration. Accordingly, the projection of the end configuration can be inserted into the matching indentation on a panel having the same end configuration. Thus, in some embodiments, a particular end configuration is mateable with the same type of end configuration on another panel. In particular, in some embodiments, this connection is possible when one of the panels is rotated by 180 degrees with respect to the other about an axis that is perpendicular to the front face.

Figure 4:
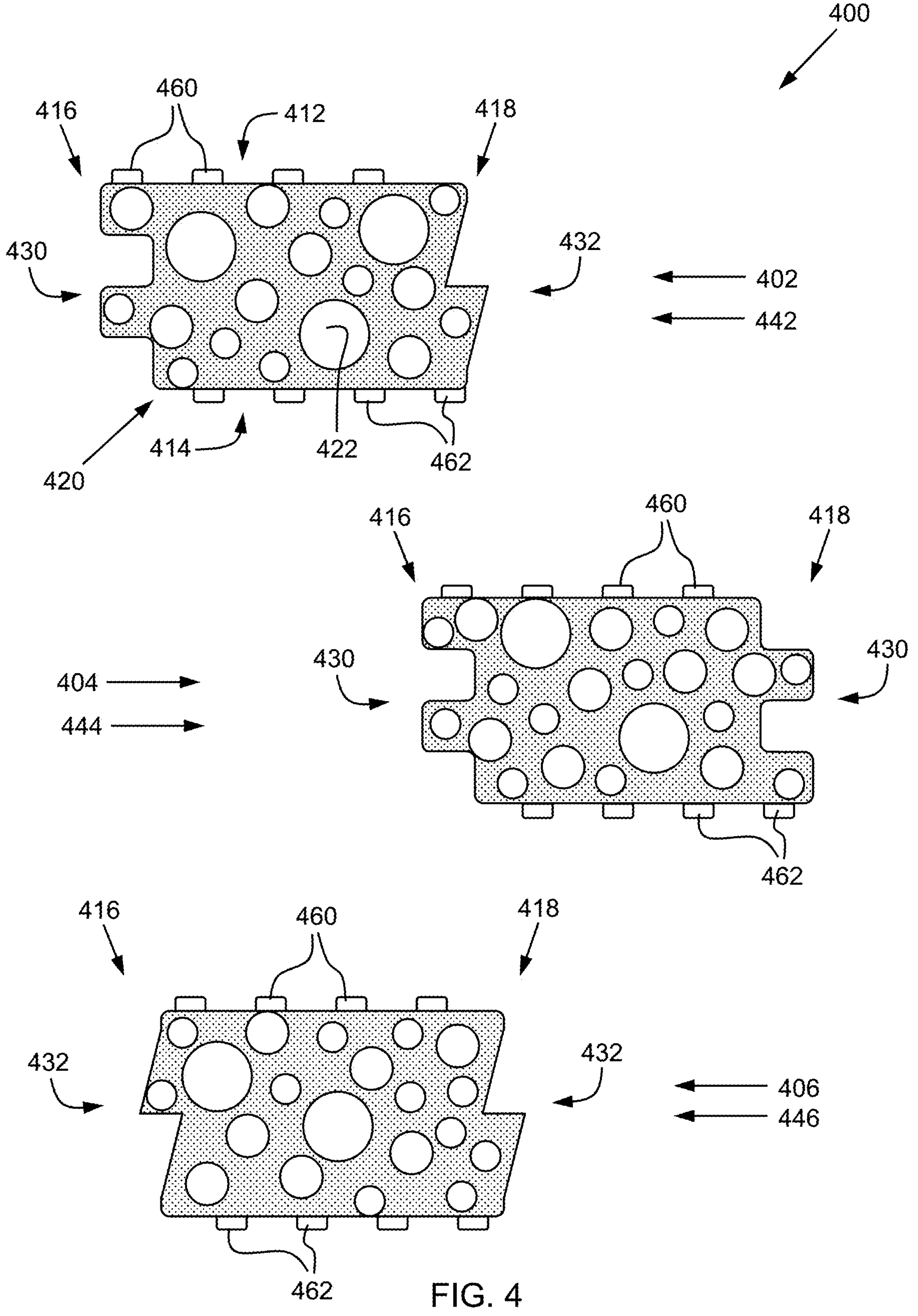
FIG. 4 is a schematic front view of a surface panel kit according to another embodiment of the disclosure.

In certain embodiments as otherwise described herein, the first end configuration is mateable with the first end configuration and is unmateable with the second end configuration. Further, in some embodiments, the second end configuration is mateable with the second end configuration and is unmateable with the first end configuration. A surface panel kit including such end configurations is shown in FIG. 4. Surface panel kit 400 includes three panel types 442, 444, 446 and two end configurations 430, 432. First end configuration 430 is mateable with first end configuration 430 if the second copy of first end configuration 430 is rotated 180 degrees with respect to the first. However, first end configuration 430 is unmateable with second end configuration 432. Similarly, second end configuration 432 is mateable with second end configuration 432 if the second copy of second end configuration 432 is rotated 180 degrees with respect to the first copy.

One of each panel type that is included in kit 400 is shown in FIG. 4, respectively represented by panels 402, 404, and 406. Each of the panels includes an upper side 412, a lower side 414, a first end 416 and a second end 418, as identified in FIG. 4 with respect to panel 402. Each panel also includes a panel body 420 with a front face 422 having a decorative design. The ends 416, 418 of the panels in the surface panel kit 400 are configured to mate with the ends of other panels in the kit in a manner that forms linear rows of panels.

Figure 5:
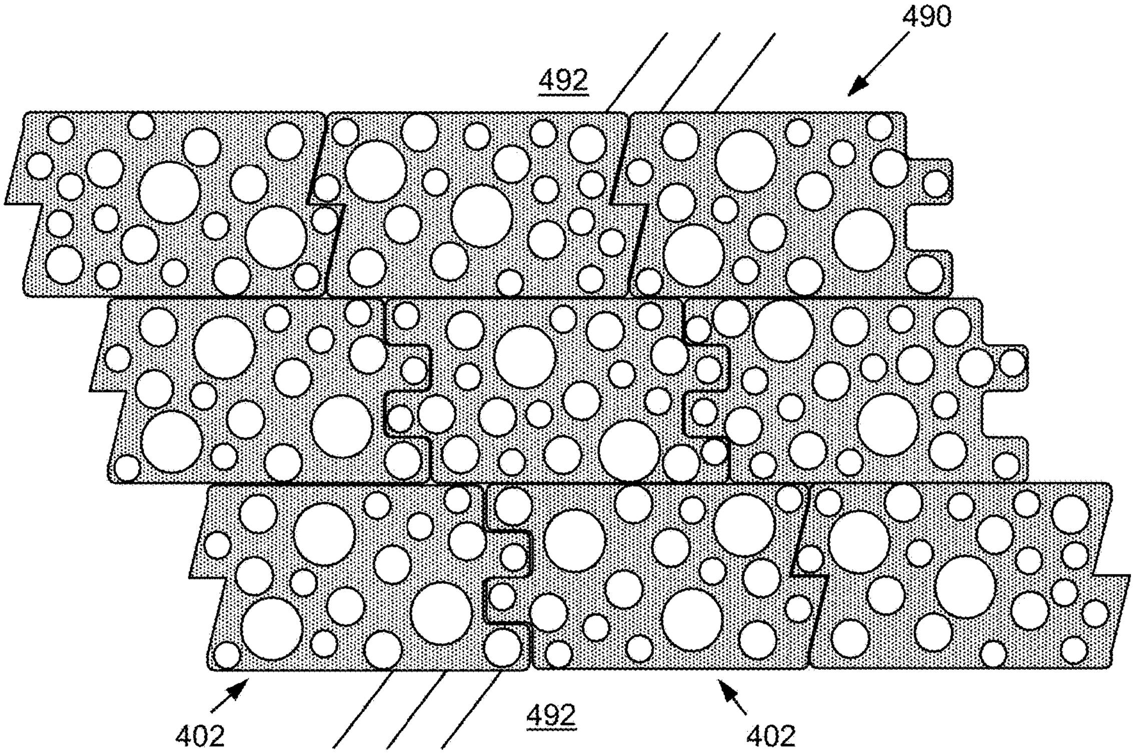
FIG. 5 is a schematic front view of a surface panel system including the surface panel kit of FIG. 4.

In certain embodiments as otherwise described herein, both ends of the second panel type include the first end configuration, and both ends of the third panel type include the second end configuration. For example, panel kit 400 includes a first panel type 442 that includes the first end configuration 430 with the second end configuration 432, a second panel type 444 that includes the first end configuration 430 at both ends 416, 418, and a third panel type 446 that includes the second end configuration 432 at both ends 416, 418. Thus, the second panel type 444 is mateable with itself, as the first end configuration 430 is mateable with itself, and also mateable with the first panel type 442, because it includes the first end configuration. Similarly, the third panel type 446 is mateable with itself and with the first panel type 442. FIG. 5 shows an embodiment of a surface panel system 490 including nine of the panels from surface panel kit 400 disposed on a support structure 492. The mateable end configurations are connected to one another to form a continuous decorative surface on the support structure 492.

While surface panel kit 400 includes three panel types and two end configurations, and surface panel kit 100 includes four panel types and four end configurations, in other embodiments the surface panel kit includes more than four panel types and more than four end configurations. For example, in some embodiments, the surface panel kit includes three left-side end configurations and three right-side end configurations, totaling six end configurations. Some embodiments including six end configurations have nine panel types, including a different panel type for each pair of end configurations (e.g., A-A', A-B', A-C', B-A', B-B', B-C', C-A', C-B', C-C'). Other embodiments including six end configurations have six panel types, including a different type for each pair of end configurations but excluding matching end configurations on the same panel type (e.g., A-B', A-C', B-A', B-C', C-A', C-B'). Such an embodiment prevents any two panels in a row from being the same, as no panel may be connected with a panel of the same type.

In addition to having different end configurations, the different panel types may also have different decorative designs. Indeed, in some embodiments, the surface panel kit includes different panel types that have the same end configurations but different decorative designs on the front face. For example, a surface panel kit may include a fifth panel type that has the same end configurations as the first panel type, but has a different decorative design on the front face.

In certain embodiments as otherwise described herein, each of the panels includes a first fastening strip disposed along the upper side thereof, the fastening strip being configured to secure the panel to the support structure. For example, panels 102, 104, 106 and 108 each include a fastening strip 160 across the upper side thereof. The fastening strip is configured to receive mechanical fasteners, such as nails or screws, for attaching the panel to the support strip. In some embodiments, the fastening strip includes apertures for receiving the mechanical fasteners. In other embodiments, the mechanical fasteners may be driven through the fastening strip.

In certain embodiments as otherwise described herein, each of the panels includes a second fastening strip disposed along the lower side thereof. For example, panels 402, 404 and 406 shown in FIG. 4 includes fastening strips 460, 462 on opposing upper and lower sides of the panel. This configuration allows the panels to be easily installed in two orientations using the respective fastening strips. For example, panel 402 can be hung from fastening hem strip 460 on one side of the panel, or the panel can be rotated 180 degrees and hung from the fastening hem 462 on the other side of the panel. Each of fastening strips 460, 462 include several sections. The sectioned configuration of fastening strips 460 and 462 provides adequate gaps within the fastening strip allowing the panels to cooperate with neighboring panels without interfering with one another. For example, the sections of the fastening strip at the top of one panel may rest in the gaps between the sections of the fastening strip at the bottom of an adjacent panel.

In other embodiments, the panels are configured for attachment to a support structure using an adhesive. For example, in some embodiments, the panels include a rear face that is substantially planar to form a surface for receiving the adhesive. As will be appreciated by those of ordinary skill in the art, the rear face may be flat or have a texture to promote adhesion. In some embodiments, the adhesive is an organic adhesive, such as a curable glue, a single component epoxy, a two component epoxy, a hot-melt thermoplastic, or a polyurethane resin. In other embodiments, the adhesive is an inorganic adhesive, such as mortar or cement.

In certain embodiments as otherwise described herein, the first end configuration includes a first contoured edge of a panel body and is mateable with an end configuration including a matching contoured edge of another panel body. The term contoured edge, as used herein, refers to a non-linear edge extending between the upper side and the lower side of the panel body, and that includes at least one projection or indentation between the upper side and lower side. In particular, the projection and/or indentation extends across the entire thickness of the panel body, such that an undulating silhouette of the contoured edge is visible when viewing the front face of the panel body. For example, first end configuration 130 is formed by a first contoured edge 150 that includes a central indentation 170 between the upper side 112 and the lower side 114. Further first contoured edge 150 also includes chamfered corners 172 that contribute to the contour of the edge.

The phrase matching contoured edge, as used herein, refers to a substantially reversed contour such that the two matching end configurations can fit together in a manner similar to a puzzle. Thus, for each projection in the contoured edge of an end configuration, a matching end configuration includes a corresponding indentation, and for each indentation in the end configuration, the matching end configuration includes a corresponding projection. Moreover, the matching end configurations are mateable such that they fit together without substantial gaps formed between the front faces of each panel body. As a result, mateable panels with matching end configurations form a continuous front surface that extends over both panels. For example, third end configuration 134 (shown on second panel 104) is mateable with first end configuration 130 and includes a matching contoured edge 152 that couples with contoured edge 150. In particular, matching contoured edge 152 includes a central projection 174 between the upper side and lower side of the respective panel that is configured for insertion into the central indentation 170 of first contoured edge 150. Likewise, matching contoured edge 152 also includes angled projections 176 at the upper and lower sides of the edge that are configured to match the chamfered corners 172 of first contoured edge 150.

In certain embodiments as otherwise described herein, the second end configuration includes a second contoured edge of a panel body and is mateable with an end configuration including a matching contoured edge of another panel body. For example, in surface panel kit 100, second end configuration 132 has a contoured edge that matches the contoured edge of fourth end configuration 136, which allows second end configuration 132 and fourth end configuration 136 to be mateable with one another.

While all of the end configurations in surface panel kit 100 include contoured edges of the panel bodies, in some embodiments at least a portion of the end configurations include a panel body with a linear edge. For example, in certain embodiments as otherwise described herein, the second end configuration includes a linear edge of the panel body. For example, the linear edge may extend directly between the upper side and lower side of the panel in a direction perpendicular to the line of the row formed by the panels, i.e., a straight edge, or the linear edge may be at an angle to line of the row. An end configuration with such a linear edge is mateable with another end configuration having a linear edge at a complimentary angle, but is unmateable with an end configuration having a contoured edge. For example, none of the end configurations 130, 132, 134, 136 shown in FIG. 1, is mateable with an end configuration formed by a linear edge of a panel body, as the indentations and projections of these end configurations are not mechanically compatible with a linear edge.

Figure 6:
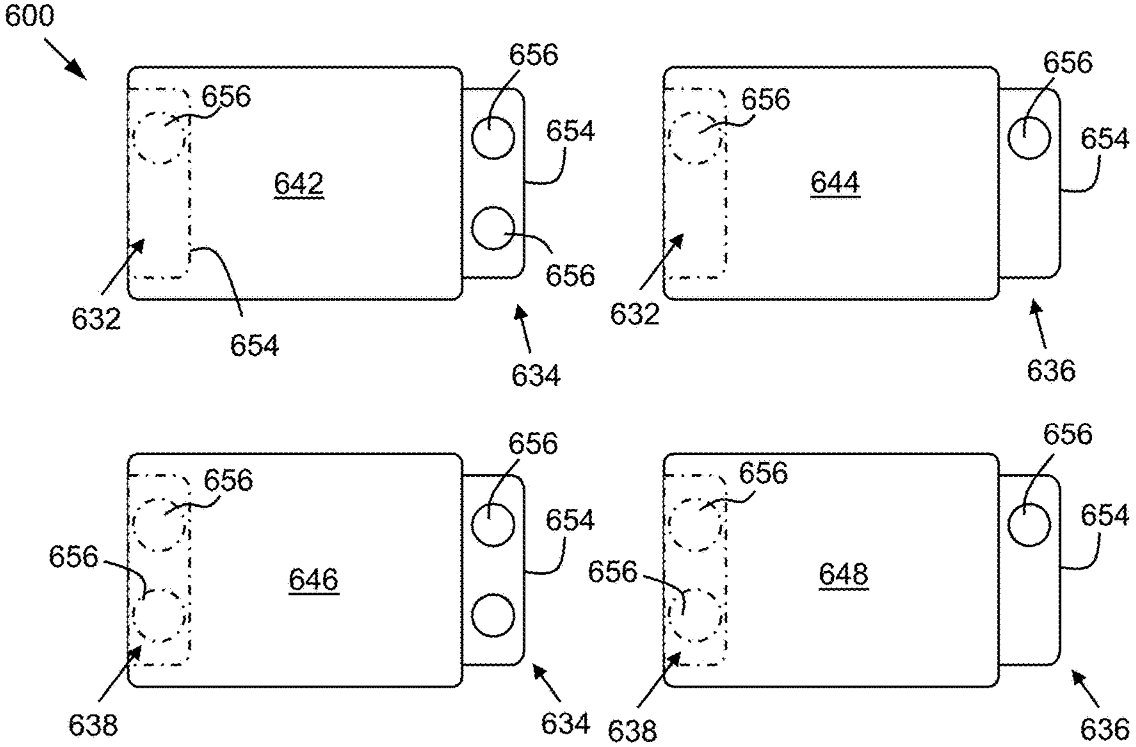
FIG. 6 is a schematic front view of a surface panel kit according to another embodiment of the disclosure.

In certain embodiments as otherwise described herein, each first end configuration includes a connector comprising at least one fastener configured to attach to a matching fastener of another connector on another panel. Each of the fasteners may be formed as any of a variety of different structures for connecting one panel to another, including a plug, a socket, a hook, a loop, a flange, a prong, a tongue, a groove, a slot, a stud, a magnet, a snap-fit connector, or another connecting structure. For example, surface panel kit 600, shown in FIG. 6, includes four panel types 642, 644, 646, 648 that collectively include four end configurations 630, 632, 634, 636. The decorative front faces of the panels of surface panel kit 600 are omitted for clarity. Each of the end configurations of surface panel kit 600 respectively includes a connector 654 that has one or two fasteners 656. In particular, each panel type includes a right-side connector that extends outward from the panel body 620 and a left-side connector that is behind the panel body 620. Of course, in other embodiments, a connector extends from the left side, while the right-side connector is behind the panel body. Other configurations are also possible, as explained in more detail below.

First panel type 642 includes a first end configuration 630 on the left side that is formed by a connector 654 that includes a single socket 656 toward the upper side of the panel. First panel type 642 also includes a second end configuration 632 on the right side that is formed by a connector 654 that includes two plugs. Second panel type 644 includes the first end configuration 630 on the left side and a third end configuration 634 on the right side that is formed by a connector 654 including a single plug 656 toward the upper side of the panel. The plug on the connector 654 of the third end configuration 634 is mateable with the socket on the connector of the first end configuration 630. Thus, the right side of the second panel type 644 is mateable with the left side of either the first panel type 642 or the second panel type 644.

The third panel type 646 includes a fourth end configuration 638 formed by a connector that includes two sockets on the left side and the second end configuration 632 on the right side. Thus, the first panel type 642 is mateable on the right side with the third panel type 646 or the fourth panel type 648. The first panel type 642 is also mateable on the left side with the second panel type 644 or the fourth panel type 648. The second panel type 644 is mateable on the left side with another copy of the second panel type 644 or the fourth panel type 648, and is mateable on the right side with the first panel type 642 or another copy of the second panel type 644. The third panel type 646 is mateable on the left side with the first panel type 642 or another copy of the third panel type 646, and mateable on the right side with another copy of the third panel type 646 or the fourth panel type 648. The fourth panel type 648 is mateable on the left side with the first panel type 642 or the third panel type 646 and is mateable on the right side with the first panel type 642 or the second panel type 644.

In certain embodiments as otherwise described herein, the connector is attached to the panel body. For example, in some embodiments, the connector is a metal or plastic structure that is secured to the panel body using mechanical fasteners. In other embodiments, the connector is welded to the panel body. Still in other embodiments, the connector is integrally formed with the panel body. For example, in some embodiments, the connectors are formed as plugs and sockets extend from or into a side wall of the panel body. In other embodiments, the connectors are formed as tongue and groove configurations in the side walls of the panel bodies. Other configurations of the connectors that are integrally formed with the panel body are also possible.

In certain embodiments as otherwise described herein, the first end configuration includes a connector with a different number of fasteners than the connector of the second end configuration. For example, first end configuration 632 in surface panel kit 600 includes a connector 654 with a single fastener 656, while second end configuration 634 includes a connector 654 with two fasteners 656.

Figure 7:
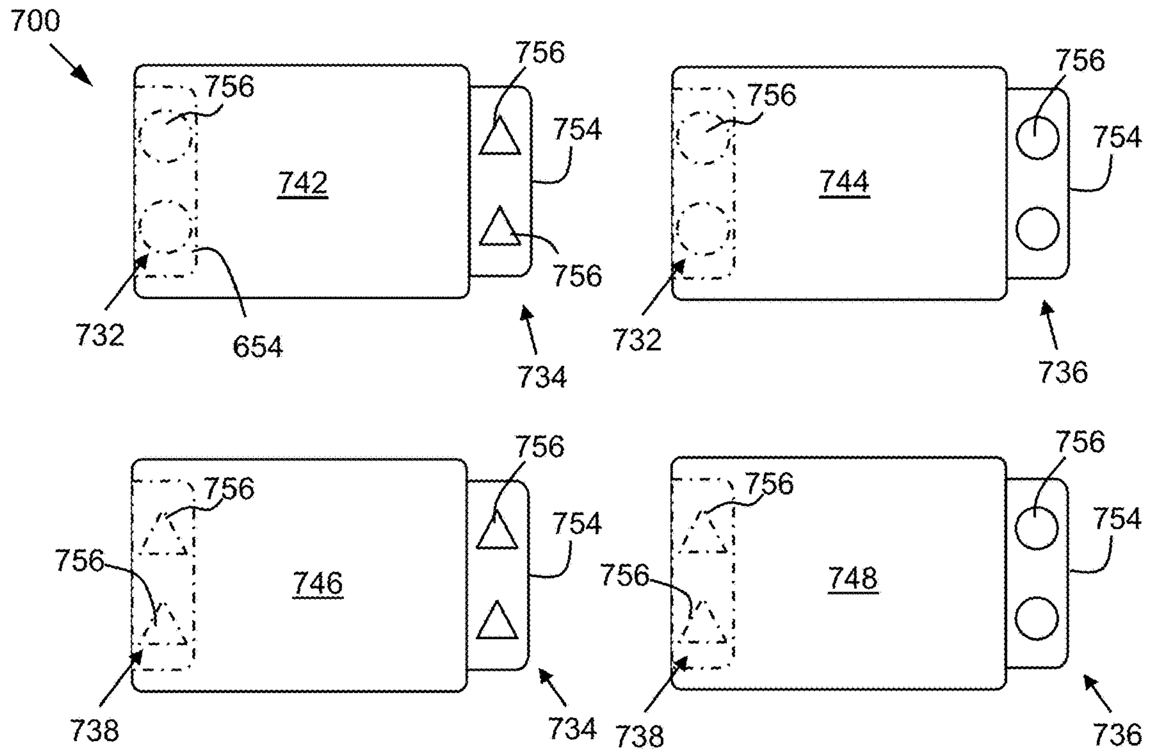
FIG. 7 is a schematic front view of a surface panel kit according to yet another embodiment of the disclosure.

In certain embodiments as otherwise described herein, the first end configuration includes a different shaped fastener than the second end configuration. For example, surface panel kit 700, shown in FIG. 7, includes four panel types 742, 744, 746, 748 that collectively include four end configurations 730, 732, 734, 736 that have connectors with fasteners of different shapes. Similar to FIG. 6, the decorative front faces of the panels of surface panel kit 700 in FIG. 7 are omitted for clarity. Each of the end configurations of surface panel kit 700 respectively includes a connector 754 that has two fasteners 756. First panel type 742 includes a first end configuration 730 on the left side that is formed by a connector 754 that includes two circular sockets 756. First panel type 742 also includes a second end configuration 732 on the right side that is formed by a connector 754 that includes two triangular plugs. Second panel type 744 includes the first end configuration 730 on the left side and a third end configuration 734 on the right side that is formed by a connector 754 including two circular plugs. The third panel type 746 includes a fourth end configuration 738 formed by a connector that includes two triangular sockets on the left side and the second end configuration 732 on the right side. Thus, each panel type is mateable on the left side with two of the panel types and unmateable on the left side with two of the panel types, and is mateable on the right side with two of the panel types and unmateable on the right side with two of the panel types, similar to the surface panel kit 600 as described above.

Figure 8:
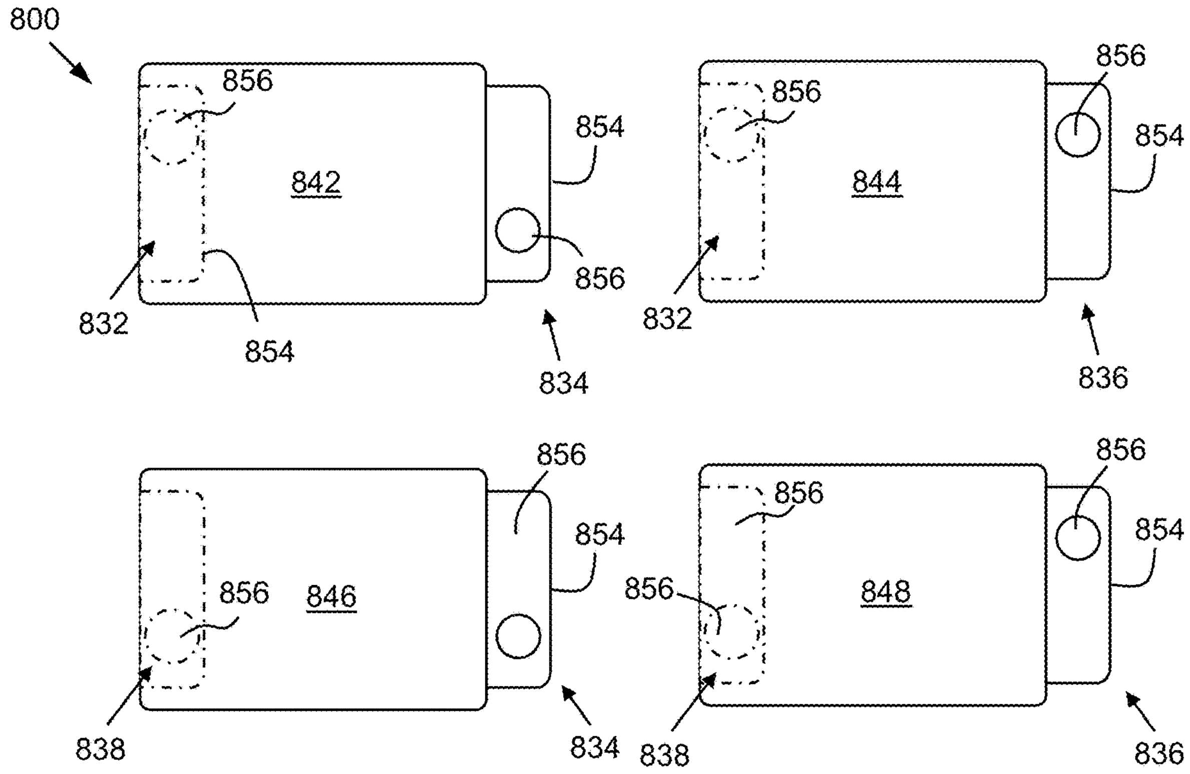
FIG. 8 is a schematic front view of a surface panel kit according to another embodiment of the disclosure.

In certain embodiments as otherwise described herein, a fastener of the first end configuration is in a different position than a fastener of the second end configuration. For example, surface panel kit 800, shown in FIG. 8, includes four panel types 842, 844, 846, 848 that collectively include four end configurations 830, 832, 834, 836 that have connectors with fasteners of different shapes. Similar to FIG. 6, the decorative front faces of the panels of surface panel kit 800 in FIG. 8 are omitted for clarity. Each of the end configurations of surface panel kit 800 respectively includes a connector 854 that has a fastener 856. First panel type 842 includes a first end configuration 830 on the left side that is formed by a connector 854 that includes a socket toward the upper side of the panel. First panel type 842 also includes a second end configuration 832 on the right side that is formed by a connector 854 that includes a plug toward a lower side of the panel. Second panel type 844 includes the first end configuration 830 on the left side and a third end configuration 834 on the right side that is formed by a connector 854 including a plug toward the upper side of the panel. The third panel type 846 includes a fourth end configuration 838 formed by a connector that includes a socket toward the lower side of the panel on the left and the second end configuration 832 on the right. Thus, each panel type is mateable on the left side with two of the panel types and unmateable on the left side with two of the panel types, and is mateable on the right side with two of the panel types and unmateable on the right side with two of the panel types, similar to the surface panel kit 600 as described above.

In certain embodiments as otherwise described herein, the panel body of each panel has a width in a range from 4 inches to 12 feet, e.g., 18 inches to 8 feet, e.g., 30 inches to 6 feet. The panel body includes the visible portion of the panel and comprises the decorative front face. Any portion of the panel that is hidden behind another panel, such as the fastening strip, is described herein as a separate element, though it may be integrally formed with the panel body.

In certain embodiments as otherwise described herein, each panel body includes an upper edge and a lower edge, and wherein the upper edge is the same length as the lower edge. In some embodiments, the upper edge of each panel in the surface panel kit is the same length. Embodiments in which there is uniformity in the upper and/or lower edges allows uniform spacing of the panels along each row. Such uniform spacing allows matching of panels between adjacent rows in addition to along the row. In other embodiments, the upper edge and lower edge have different lengths. For example, the upper edge of panel type 142 of surface panel kit 100, shown in FIG. 1, is longer than the lower edge.

In certain embodiments as otherwise described herein, the panel body of each panel has a height in a range of 4 inches to 8 feet, e.g., 8 inches to 3 feet, e.g., 12 inches to 36 inches. Again, as set forth above, the panel body, as referred to herein, does not include any fastening strip included in the panel.

In certain embodiments as otherwise described herein, each of the panel bodies has the same height. In other embodiments, some of the panels have different heights. For example, in some embodiments, an additional panel type has twice the height of the other panels, and each side of this panel includes two end configurations configured to match with the other panels.

In certain embodiments as otherwise described herein, the panel body of each panel includes an upper edge and a lower edge, and wherein the upper edge and the lower edge are straight.

In certain embodiments as otherwise described herein, the panel body of each panel includes an upper edge having a first contoured shape and a lower edge having a second contoured shape. Further, the first contoured shape is mateable with the second contoured shape. For example, in some embodiments, each of the panels includes a central upward projection along each upper edge and a central upward indentation along each lower edge. Accordingly, in such embodiments, the projection of each panel fits into the indentation of an upward neighboring panel. Such a configuration allows the boundary between adjacent rows to be non-linear. Further, in some embodiments, the upper and lower edges are only mateable with certain other panels in the set.

In certain embodiments as otherwise described herein, panels of the same panel type include the same decorative design. For example, in surface panel system 190, shown in FIG. 3, three copies of first panel type 142 are included in the nine shown panels, and each of the three copies include the same decorative design. In other embodiments, more than one decorative design is available for each panel type. For example, in some embodiments, panels of the same panel type include two to four decorative designs.

In certain embodiments as otherwise described herein, the decorative design of each panel is a non-repetitive design. As used herein, a non-repetitive design includes any design in which shapes or design elements are not regularly repeated in a predictable pattern. In other words, the shapes or design elements are not repeated at a consistent distance from one another. For example, the decorative design of the panels of surface panel kit 100 (FIGS. 1-3) includes an arrangement of stone elements across the front face of the panels. The stone elements are not regularly repeated within the design of the front face of the panels. Likewise, the decorative design of the panels in surface panel kit 400 (FIGS. 4 and 5) includes an arrangement of circles of varying size. Again, the positioning of the circles does not repeat within each panel in any regular or predictable manner.

In certain embodiments as otherwise described herein, the front face of each panel body includes a surface texture. The term surface texture, as used herein, refers to the specific three dimensional shape of the front face, including all of the peaks, pits, ridges, and valleys of the surface's contour. In certain embodiments as otherwise described herein, surface texture has a contour depth range that is no more than 5 cm, e.g., no more than 2 cm, e.g., no more than 1 cm, e.g., no more than 0.5 cm. The term contour depth range, as used herein, refers to the difference in depth, with respect to a direction perpendicular to the front surface of a panel, between the lowest valley and the highest peak across the front surface of a respective panel. For example, the stone elements in surface panel kit 100 are three dimensional and form a surface texture across each of the panels.

In certain embodiments as otherwise described herein, panels of the same panel type include the same surface texture. For example, in some embodiments, panels of the same panel type include panel bodies that are cast or otherwise formed in the same mold (or molds having the same three-dimensional shape). For instance, surface panel system 190, shown in FIG. 3, includes three copies of first panel type 142, and each of the three copies include the same surface texture that replicates a group of stones. In other embodiments, more than one surface texture is available for each panel type. For example, in some embodiments, panels of the same panel type include a surface texture from of a group of two to four surface textures. Thus, as an example, panels of the first panel type may be formed in any of several different molds. For clarity, a panel type is characterized by the combination of end configurations. Accordingly, in some embodiments, several panels of the first panel type, each of which includes the first end configuration with the second end configuration, have different surface textures.

In certain embodiments as otherwise described herein, the decorative design of each panel replicates wood or bamboo.

In certain embodiments as otherwise described herein, the decorative design of each panel replicates masonry units. For example, in some embodiments, the decorative design of each panel replicates flat polished stone, such as marble blocks. In other embodiments, the decorative design of each panel replicates split stone masonry units. The term split stone masonry units broadly refers to any stones that have been broken or worked to a desired shape and thereby have a textured contour that replicates a fractured surface of the stone. Thus, the term split stone encompasses most stone surfaces that are generally flat but have not been polished to a smooth surface. Still in other embodiments, the decorative design of each panel replicates rounded stones, for example, stones that have been naturally worn to a smooth surface through abrasion or by water. For example, in some embodiments, the decorative design replicates river rocks. Further, in some embodiments, the decorative design replicates other masonry units, such as brick. As an example, the decorative design of surface panel kit 100 includes split stone elements.

In certain embodiments as otherwise described herein, the decorative design of each panel includes an image of a natural construction product. For example, in certain embodiments, the decorative design of each panel includes a printed image of one or more pieces of wood, bamboo or stones. Thus, the decorative designs of the panels may appears as wood planks, parquet, individual stones, or groups of stones, such as in surface panel system 100.

In certain embodiments as otherwise described herein, the surface texture includes a digitized rendering of a natural construction product. For example, in some embodiments one or more natural construction materials is scanned using either a laser scanner or a white light scanner to form a digital 3D rendering of the natural construction material(s). For instance, a wooden plank, or a surface formed by a group of stones may be scanned. A mold is then fabricated using the digital rendering and the panels are produced with the digitized rendering of the natural material from the mold. In other embodiments, digital rendering of the natural material is used by a 3D printer to create the panels. Still in other embodiments, a cast is made from the naturally occurring material, and a mold is subsequently made based on the cast.

Figure 9:
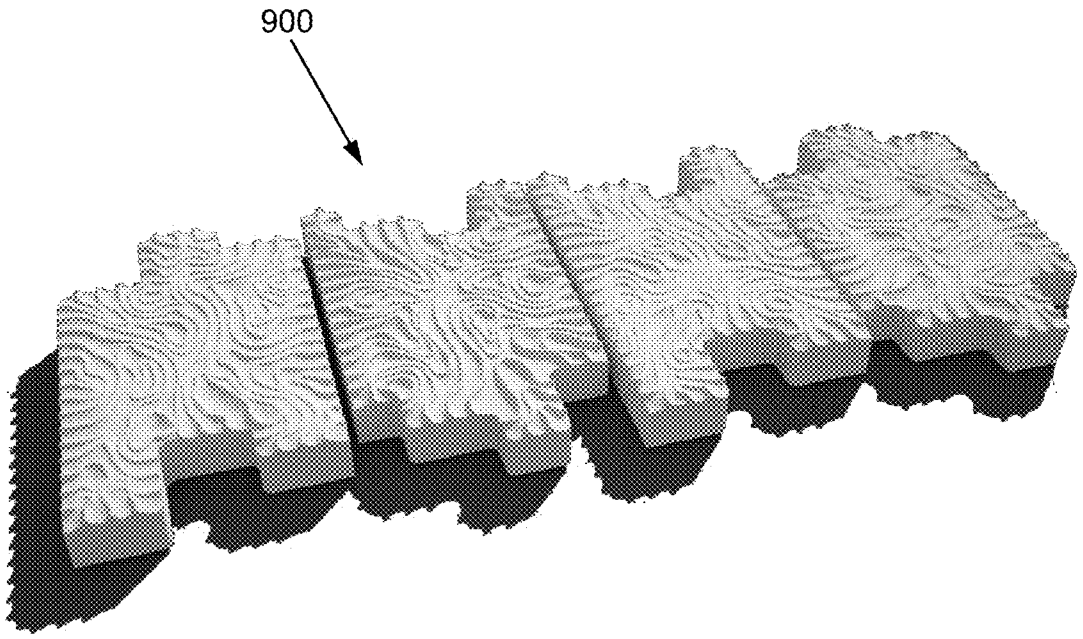
FIG. 9 is a schematic perspective view of a surface panel kit according to another embodiment of the disclosure.

In certain embodiments as otherwise described herein, the decorative design of two mateable panels extends from a panel body of a first of the two panels to a panel body of a second of the two panels. For example, the panel bodies in surface panel kit 900, shown in FIG. 9 include a design of meandering ridges. At the outer edges of each of the panel bodies, the ridges extend outward at regular intervals.

Accordingly, when the panels are mated, the ridges extend across from one panel to the next such that the decorative design extends from the first panel to the second panel.

In certain embodiments as otherwise described herein, each panel includes indicia indicative of one of the end configurations of the group of end configurations that is mateable with an end configuration of the panel. For example, an alphanumeric indicator may be printed or inscribed at either end of the panel to guide an installer in choosing a neighboring panel to mate with the first panel. The indicia may be included at various locations, such as on the end of the panel bodies, on the rear surfaces of the panels, or on the fastening strip.

In certain embodiments as otherwise described herein, each of the panels is formed of a polymer material. In some embodiments, each of the panels is formed of one or more of polypropylene, polyethylene, polyvinyl chloride (PVC), acrylonitrile styrene acrylate (ASA), polyurethane, or acrylonitrile butadiene styrene (ABS). Further, while the system includes panel bodies formed of a polymer material, in that the structure and shape of the panel body is associated with a polymer construction, the panel bodies can include a large percentage of filler. For example, a panel formed with a polyurethane matrix may include a majority of filler (such as fly ash) and still be considered a "formed of a polymer material," as will be appreciated by those of ordinary skill in the art. Likewise, the panel bodies may include small sections that are made from another material, such as a metal. For example, in some embodiments the corners of the panel bodies may include a metal frame for stability. Further, in some embodiments, the panels include a cementitious material. The term cementitious, as used herein, refers to material that reacts with or binds water to a high degree and can form a mortar-like material in the set form, such as Portland cement. In other embodiments, the panels include other materials.

In certain embodiments as otherwise described herein, each of the panel bodies includes a coating disposed over at least the front face. In some embodiments, the coating blocks ultraviolet (UV) light to protect the body of the panel from UV degradation. In some embodiments, the coating is decorative and imparts a particular visual aspect to the panel body. For example, in some embodiments the coating is opaque and has a particular color. In other embodiments, the coating is transparent. In some embodiments, the coating is variegated, such that different portions of the surface of the panel body have different colors. For example, in some embodiments, the coating is partially transparent such that sections of the underlying material of the panel body show through the coating while other sections are overlaid with an opaque covering. In some embodiments the coating includes an image of a natural product. In some embodiments, the coating provides a texture to the surface of the panel, for example to provide a desired tactile sensation when the panel is touched.

In certain embodiments, the coating is applied directly to the outer surface of the panel body. In other embodiments, the coating is applied to the surface of a mold and is secured to the material of the panel body during a molding process. In some embodiments, the coating is provided as a liquid that is sprayed or otherwise applied onto the panel body or into a mold. In other embodiments the coating is a film or laminate that is stretched over or otherwise applied to the panel body. Still, in other embodiments the film or laminate coating is inserted into a mold before the molding process.

In certain embodiments as otherwise described herein, each of the panel bodies is injection molded, thermoformed, or rotational molded. Further, in some embodiments, the entire panel is injection molded, thermoformed, or rotational molded. In other embodiments, each of the panels is blow molded, extruded, or cast. For example, in some embodiments the panels are formed of polyethylene and roto-molded. In some embodiments the panel bodies are fabricated through an additive process. For example, in some embodiments the panel bodies are made by 3D printing.

In certain embodiments as otherwise described herein, the surface panel kit further includes end panels including an end configuration from the group of end configurations at a first end of the panel and a straight edge at a second end of the panel. For example, in some embodiments, the surface panel kit includes panels with one end that is configured to mate with other panels of the kit and another end that has a straight edge for cooperating with another surface at an end of the panelized wall. The surface panel kit may also include corner panels, as will be appreciated by those of ordinary skill in the art.

In certain embodiments as otherwise described herein, the panels are configured to form a decorative surface of a wall. For example, the surface panel kit 100 shown in FIG. 1 is configured to form a wall surface that replicates a split stone wall. In other embodiments, the panels are configured to form a decorative surface of a floor or a ceiling.

In another aspect, the disclosure provides a surface panel system including a support structure and an array of panels of the surface panel kit according to the disclosure attached to the support structure. The array of panels is arranged in linear rows with mateable end configurations coupled to one another. For example, FIGS. 2 and 3 show a portion of a surface panel system 190 formed of panels from surface panel kit 100. Surface panel system 190 includes three linear rows of panels including a top row 124, a middle row 126 and a bottom row 128 attached to support structure 192. In each row, the panels are coupled on at least one end to a neighboring panel having a mateable end configuration. The connection between the panels within each linear row forms a decorative surface without any substantial gaps in the surface. For example, where no gap greater than 0.25 inches is formed between panels along the linear row. Likewise the boundaries between the linear rows of panel are linear and abut one another so as to form a continuous decorative surface across the rows, without any substantial gaps in the surface.

In some embodiments, the support structure is a continuous surface, for example a sheet of material that forms a substrate, such as a wooden board. In other embodiments, the support structure is in the form of a frame formed by a plurality of framing elements, such as studs or furring strips. In some embodiments, the support structure forms a planar surface that receives the panels. In other embodiments the support structure is curved and the panels form a curved building surface.

In certain embodiments as otherwise described herein, the array of panels includes a first panel of the first panel type coupled to a second panel of the first panel type, and wherein the second panel is rotated 180 degrees with respect to the first panel. For example, FIG. 5 shows a portion of a surface panel system 490 formed of panels from surface panel kit 400. At the lower left corner of the portion of surface panel system 490 shown in FIG. 5, the panels include a first panel of first panel type 402 and a second panel of panel type 402 rotated at 180 degrees from the first panel. The two similar panels are coupled to one another via first end configuration 430, which is rotationally symmetrical. The other panels are also coupled to neighboring panels through mateable end configurations. Further, similar to surface panel system 190, the linear rows of panels abut one another, such that a continuous decorative design is formed by the combination of all nine panels.

In certain embodiments as otherwise described herein, each of the panels is attached to the support structure using a mechanical fastener. For example, in some embodiments the panels are attached to the support structure using screws, nails, bolts, or staples that pass through the fastening strip and into the support structure. Other fasteners for attaching the panels to the support structure are also possible, as will be appreciated by those of ordinary skill in the art.

In certain embodiments as otherwise described herein, the surface panel system forms a wall surface. For example, surface panel system 190 is part of an exterior wall of a building. In other embodiments, the surface panel system forms a floor surface or a ceiling surface. For example, in some embodiments the support structure is an exterior sheathing. As will be understood by those of ordinary skill in the art, such an exterior sheathing can include a rain protection layer, house wrap, and/or may include furring strips. In other embodiments, the support structure is another flat structural component of a construction wall. Still, in other embodiments, the support structure is a floor sublayer, or a ceiling support structure.

In certain embodiments as otherwise described herein, the array of panels is arranged in columns, with the ends of each panel aligned with the ends of adjacent panels in a neighboring row. For example, in surface panel system 190, the panels are arranged in columns such that the ends of the panels in one row are aligned with the ends of the panels in another row. In other embodiments, the linear rows of panels are offset from neighboring rows such that the ends of each panel are staggered with the ends of adjacent panels in a neighboring row. Such an offset avoids a continuous boundary line extending vertically across the building surface.

Additional embodiments of the disclosure are provided by the enumerated embodiments provided below, which can be combined in any number and in any combination not logically or technically inconsistent:

Embodiment 1. A surface panel kit comprising:

- a set of panels configured for attachment to a support structure, each of the panels including an upper side, a lower side, opposing ends, and a panel body having a front face including a decorative design,
- wherein the ends of each panel are configured to mate with the ends of other panels in the set of panels to form a linear row of panels that includes a continuous decorative surface formed by the front faces of the panel bodies in the linear row,
- wherein each end includes one of a group of end configurations, the group of end configurations including:
  - a first end configuration that is mateable with a first portion of the group of end configurations and that is unmateable with a second portion of the group of end configurations, and
  - a second end configuration that is mateable with a third portion of the group of end configurations and that is unmateable with a fourth portion of the group of end configurations, and
- wherein the set of panels comprises at least three panel types including:
  - a first panel type that includes the first end configuration with the second end configuration,
  - a second panel type that includes the first end configuration without the second end configuration, and
  - a third panel type that includes the second end configuration without the first end configuration.

Embodiment 2. The surface panel kit according to embodiment 1, wherein each end configuration is either a left-side configuration that is mateable with a matching right-side configuration or a right-side configuration that is mateable with a matching left side configuration.

Embodiment 3. The surface panel kit according to embodiment 2, wherein the first end configuration is a first left side configuration and the second end configuration is a first right-side configuration, and wherein the group of end configurations further comprises a second left side configuration and a second right side configuration.

Embodiment 4. The surface panel kit according to embodiment 3, wherein the set of panels comprises at least four panel types including:

- the first panel type that includes the first left side configuration and the first right side configuration,
- the second panel type that includes the first left side configuration and the second right side configuration,
- the third panel type that includes the second left side configuration and the first right side configuration, and
- a fourth panel type that includes the second left side configuration and the second right side configuration.

Embodiment 5. The surface panel kit according to embodiment 1, wherein the first end configuration and the second end configuration are rotationally symmetrical about an axis that is perpendicular to the front face.

Embodiment 6. The surface panel kit according to embodiment 1 or embodiment 5, wherein the first end configuration is mateable with the first end configuration and is unmateable with the second end configuration.

Embodiment 7. The surface panel kit according to any of embodiments 1, 5, or 6, wherein the second end configuration is mateable with the second end configuration and is unmateable with the first end configuration.

Embodiment 8. The surface panel kit according to any of embodiments 1 and 5 to 7, wherein two panels of the first panel type are mateable with one another when rotated 180 degrees with respect to one another.

Embodiment 9. The surface panel kit according to any of embodiments 1 and 5 to 8, wherein both ends of the second panel type include the first end configuration, and wherein both ends of the third panel type include the second end configuration.

Embodiment 10. The surface panel kit according to any of embodiments 1 to 9, wherein each of the panels includes a first fastening strip disposed along the upper side thereof, the fastening strip being configured to secure the panel to the support structure.

Embodiment 11. The surface panel kit according to embodiment 10, wherein each of the panels includes a second fastening strip disposed along the lower side thereof.

Embodiment 12. The surface panel kit according to any of embodiments 1 to 11, wherein the first end configuration includes a first contoured edge of a panel body and is mateable with an end configuration including a matching contoured edge of another panel body.

Embodiment 13. The surface panel kit according to embodiment 12, wherein the second end configuration includes a second contoured edge of a panel body and is mateable with an end configuration including a matching contoured edge of another panel body.

Embodiment 14. The surface panel kit according to embodiment 12, wherein the second end configuration includes a linear edge of the panel body.

Embodiment 15. The surface panel kit according to any of embodiments 1 to 11, wherein each first end configuration includes a connector comprising at least one fastener configured to attach to a matching fastener of another connector on another panel.

Embodiment 16. The surface panel kit according to embodiment 15, wherein the connector is attached to the panel body.

Embodiment 17. The surface panel kit according to embodiment 15 or embodiment 16, wherein the first end configuration includes a different number of fasteners than the second end configuration.

Embodiment 18. The surface panel kit according to any of embodiments embodiment 15 to 17, wherein the first end configuration includes a different shaped fastener than the second end configuration.

Embodiment 19. The surface panel kit according to any of embodiments 15 to 18, wherein a fastener of the first end configuration is in a different position than a fastener of the second end configuration.

Embodiment 20. The surface panel kit according to any of embodiments 1 to 19, wherein the panel body of each panel has a width in a range from 6 inches to 4 feet.

Embodiment 21. The surface panel kit according to any of embodiments 1 to 20, wherein each panel body includes an upper edge and a lower edge, and wherein the upper edge is the same length as the lower edge.

Embodiment 22. The surface panel kit according to any of embodiments 1 to 21, wherein an upper edge of each panel is the same length.

Embodiment 23. The surface panel kit according to any of embodiments 1 to 22, wherein the panel body of each panel has a height in a range of 4 inches to 2 feet.

Embodiment 24. The surface panel kit according to any of embodiments 1 to 23, wherein each of the panel bodies in the kit has the same height.

Embodiment 25. The surface panel kit according to any of embodiments 1 to 24, wherein the panel body of each panel includes an upper edge and a lower edge, and wherein the upper edge and the lower edge are straight.

Embodiment 26. The surface panel kit according to any of embodiments 1 to 24, wherein the panel body of each panel includes an upper edge having a first contoured shape and a lower edge having a second contoured shape, and wherein the first contoured shape is mateable with the second contoured shape.

Embodiment 27. The surface panel kit according to any of embodiments 1 to 26, wherein the decorative design of each panel is a non-repetitive design.

Embodiment 28. The surface panel kit according to any of embodiments 1 to 27, wherein the front face of each panel body includes a surface texture.

Embodiment 29. The surface panel kit according to any of embodiments 1 to 28, wherein panels of the same panel type include the same decorative design.

Embodiment 30. The surface panel kit according to embodiment 29, wherein panels of the same panel type include the same surface texture.

Embodiment 31. The surface panel kit according to embodiment 28, wherein panels of the same panel type include a surface texture from of a group of two to four surface textures.

Embodiment 32. The surface panel kit according to any of embodiments 1 to 31, wherein the decorative design of each panel replicates wood or bamboo.

Embodiment 33. The surface panel kit according to any of embodiments 1 to 31, wherein the decorative design of each panel replicates masonry units.

Embodiment 34. The surface panel kit according to embodiment 32 or embodiment 33, wherein the decorative design of each panel includes an image of a natural construction product.

Embodiment 35. The surface panel kit according to any of embodiments 32 to 34, wherein the surface texture includes a digitized rendering of a natural construction product.

Embodiment 36. The surface panel kit according to any of embodiments 1 to 31, wherein the decorative design of two mateable panels extends from a panel body of a first of the two panels to a panel body of a second of the two panels.

Embodiment 37. The surface panel kit according to any of embodiments 1 to 36, wherein each panel includes indicia indicative of an end configuration that is mateable with an end configuration of the panel.

Embodiment 38. The surface panel kit according to any of embodiments 1 to 37, wherein each panel body is formed of a polymer material.

Embodiment 39. The surface panel kit according to embodiment 38, wherein each panel body is formed of one or more of polypropylene, polyethylene, polyvinyl chloride (PVC), acrylonitrile styrene acrylate (ASA), polyurethane, or acrylonitrile butadiene styrene (ABS).

Embodiment 40. The surface panel kit according to embodiment 38 or embodiment 39, wherein each panel body is injection molded, thermoformed, or rotational molded.

Embodiment 41. The surface panel kit according to any of embodiments 1 to 37, wherein each panel body includes a cementitious material.

Embodiment 42. The surface panel kit according to any of embodiments 1 to 41, further comprising end panels including an end configuration from the group of end configurations at a first end of the panel and a straight edge at a second end of the panel.

Embodiment 43. The surface panel kit according to any of embodiments 1 to 41, wherein the panels are configured to form a decorative surface of a wall.

Embodiment 44. The surface panel kit according to any of embodiments 1 to 41, wherein the panels are configured to form a decorative surface of a floor.

Embodiment 45. A surface panel system comprising:

a support structure; and an array of panels of the surface panel kit according to any of embodiments 1 to 41 attached to the support structure, wherein the array of panels is arranged in linear rows with mateable end configurations coupled to one another.

Embodiment 46. The surface panel system according to embodiment 45, wherein the array of panels includes a first panel of the first panel type coupled to a second panel first panel type, and wherein the second panel is rotated 180 degrees with respect to the first panel.

Embodiment 47. The surface panel system according to embodiment 45 or 46, wherein each of the panels is attached to the support structure using a mechanical fastener.

Embodiment 48. The surface panel system according to any of embodiments 45 to 47, wherein boundaries between the linear rows are straight.

Embodiment 49. The surface panel system according to any of embodiments 45 to 48, wherein the surface panel system forms a wall surface.

Embodiment 50. The surface panel system according to any of embodiments 45 to 48, wherein the surface panel system forms a floor surface.

Embodiment 51. The surface panel system according to any of embodiments 45 to 48, wherein the surface panel system forms a ceiling surface.

Embodiment 52. The surface panel system according to any of embodiments 45 to 48, wherein the support structure is an exterior sheathing.

Embodiment 53. The surface panel system according to any of embodiments 45 to 48, wherein the support structure is a floor sublayer.

Embodiment 54. The surface panel system according to any of embodiments 45 to 48, wherein the support structure is a ceiling support system.

Embodiment 55. The surface panel system according to any of embodiments 45 to 54, wherein the array of panels is arranged in columns, with the ends of each panel aligned with the ends of adjacent panels in a neighboring row.

Embodiment 56. The surface panel system according to any of embodiments 45 to 54, wherein the linear rows of panels are offset from neighboring rows such that the ends of each panel are staggered with the ends of adjacent panels in a neighboring row.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method of installing a surface panel system on a support structure, the method comprising providing a surface panel kit comprising:

a set of panels configured for attachment to a support structure, each of the panels including an upper side, a lower side, opposing ends, and a panel body having a front face including a decorative design, wherein the opposing ends of each panel are configured to mate with the opposing ends of other panels in the set of panels to form a linear row of panels that includes a continuous decorative surface formed by the front faces of the panel bodies in the linear row, wherein each end includes one of a group of end configurations, the group of end configurations including:

a first left-side configuration, a second left-side configuration, a first right-side configuration that is mateable with the first left-side configuration and that is unmateable with the second left-side configuration, and a second right-side configuration that is mateable with the second left-side configuration and that is unmateable with the first left-side configuration, and wherein the set of panels comprises at least four panel types including:

a first panel type that includes the first left-side configuration and the first right-side configuration, a second panel type that includes the first left-side configuration and the second right-side configuration, a third panel type that includes the second left-side configuration and the first right-side configuration, and a fourth panel type that includes the second left-side configuration and the second right-side configuration; and attaching an an array of panels of the surface panel kit to the support structure, wherein the array of panels is arranged in a plurality linear rows with mateable end configurations coupled to one another.

2. The method according to claim 1, wherein each of the first right-side configuration and the second right-side configuration are rotationally symmetrical about an axis that is perpendicular to the front face.

3. The method according to claim 1, wherein two panels of the first panel type are mateable with one another when rotated 180 degrees with respect to one another.

4. The method according to claim 1, wherein each of the panels includes a first fastening strip disposed along the upper side thereof, the fastening strip being configured to secure the panel to the support structure.

5. The method according to claim 1, wherein each of the first left-side configuration and the second left-side configuration includes a connector comprising at least one fastener configured to attach to a matching fastener of another connector on another panel.

6. The method according to claim 1, wherein the panel body of each panel includes an upper edge having a first contoured shape and a lower edge having a second contoured shape, and wherein the first contoured shape is mateable with the second contoured shape.

7. The method according to claim 1, wherein the decorative design of each panel is a non-repetitive design.

8. The method according to claim 1, wherein the front face of each panel body includes a surface texture.

9. The method according to claim 1, wherein the array of panels includes a first panel of the first panel type coupled to a second panel of the first panel type, and wherein the second panel is rotated 180 degrees with respect to the first panel.

10. The method according to claim 1, wherein each of the panels is attached to the support structure using a mechanical fastener.

11. The method according to claim 1, wherein boundaries between the linear rows are straight.

12. The method according to claim 1, wherein the surface panel system forms a wall surface.

13. The method according to claim 1, wherein the surface panel system forms a floor surface or a ceiling surface.

14. The method according to claim 1, wherein the array of panels is arranged in columns, with the opposing ends of each panel aligned with the opposing ends of adjacent panels in a neighboring row.

15. The method according to claim 11 wherein the linear rows of panels are offset from neighboring rows such that the opposing ends of each panel are staggered with the opposing ends of adjacent panels in a neighboring row.

16. The method according to claim 1, wherein each of the first left-side configuration and the second left-side configuration are rotationally symmetrical about an axis that is perpendicular to the front face.

17. The method according to claim 1, wherein each of the first right-side configuration and the second right-side configuration includes a connector comprising at least one fastener configured to attach to a matching fastener of another connector on another panel.

* * * * *